United States Patent Office 3,296,693
Patented Jan. 10, 1967

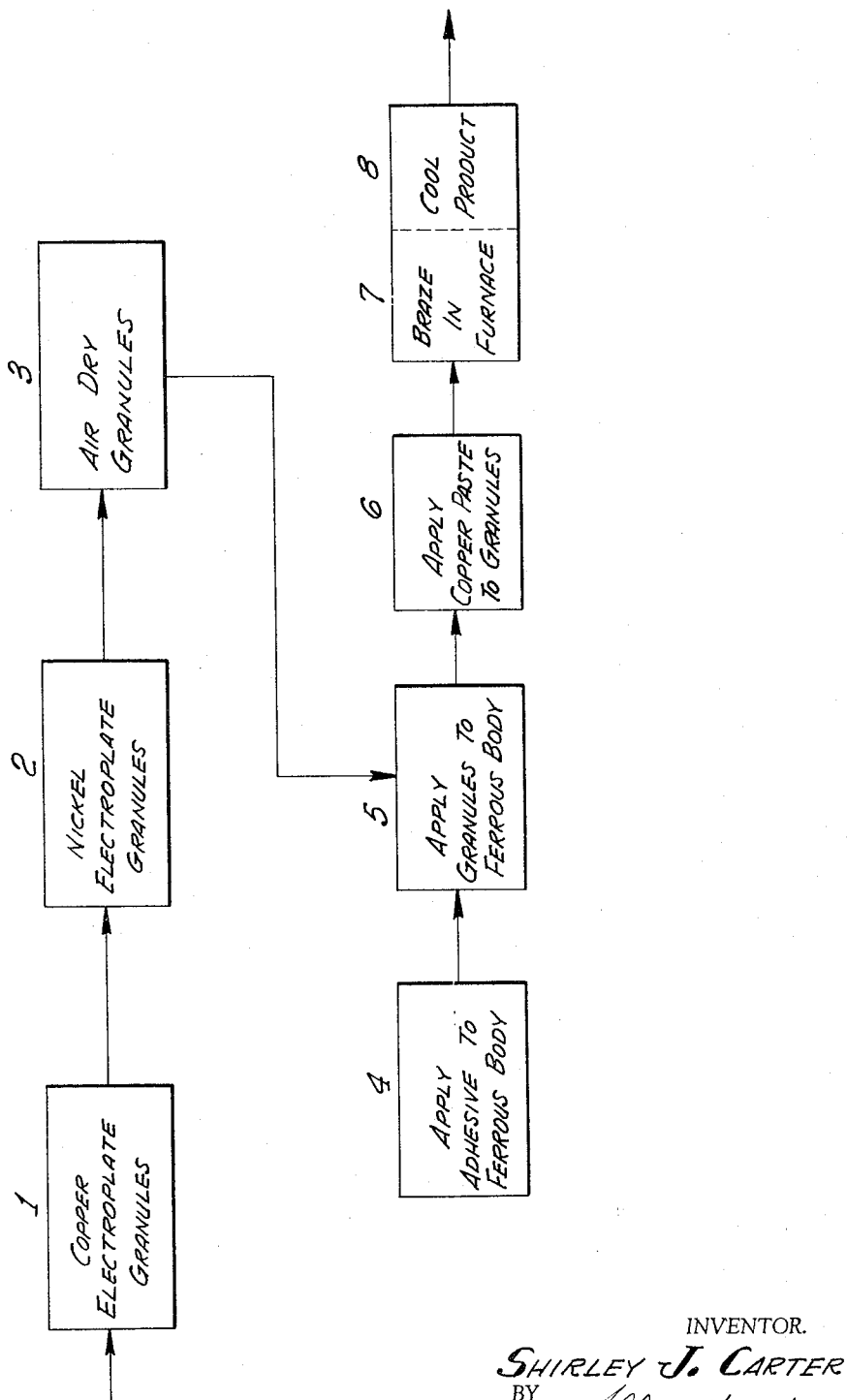

3,296,693
TUNGSTEN CARBIDE BRAZING
Shirley J. Carter, 6225 Outlook Ave.,
Oakland, Calif. 94605
Filed Sept. 21, 1962, Ser. No. 225,247
10 Claims. (Cl. 29—473.1)

This invention relates to methods and techniques for tungsten carbide brazing and more particularly the brazing of tungsten carbide chips or granules to a ferrous member or body. It is desirable to be able to attach tungsten carbide granules to a variety of members which may, for example, be band saw blades, circular saws, tire-tack rasps, etc., with the granules located exactly where required for maximum utility, i.e., the extreme points of the teeth in the case of saw blades and the like. It is necessary to move these members through a furnace with the granules held to the teeth for brazing with the teeth in any position from vertical to horizontal, without having the granules fall away from their pre-placed position by gravity. This presented rather acute problems as referred to hereinafter. While the invention has broad application as indicated, it is described herein by way of an exemplary embodiment as applied to the attaching of the granules to a band saw blade.

A primary object of the invention is to provide a solution to the problem of brazing tungsten carbide granules to ferrous members, as indicated above. The most serious difficulties to be met in solving the problem included that of finding an economical process and means for obtaining true wetting of the liquid face of the copper bonding agent used with the tungsten carbide granule and second, that of finding some means of insuring that the granule would remain where it was placed, while in the brazing furnace even on a vertical surface, during the entire time of preheating and through and above the melting point of the copper bonding agent. That is, the brazing is undertaken in a furnace and it is necessary to hold the granules in place as stated during pre-heating and through the melting point of the bonding agent. As will appear more in detail hereinafter, in the method of this invention, the granules are held in place temporarily by an applied adhesive and finally by surface tension.

It was discovered that copper in the molten state will wet and adhere to tungsten carbide in a pure, extremely dry hydrogen atmosphere or in high vacuum. All attempts to achieve this same true wetting in the controlled atmospheres of commercial furnaces prior to the discoveries of this invention were unsuccessful due to the minute amounts of water vapor and oxygen present. The cobalt matrix of the sintered tungsten carbide granules has such an affinity for oxygen at temperatures in excess of 1500° F. that it will even decompose traces of water vapor to obtain oxygen.

To meet the first difficulty stated above, there was conceived and discovered a solution which may be termed "encapsulation." An extremely thin electro-plate of copper is first applied to the granules of tungsten carbide. This plate, called a copper strike in the plating industry, is only a few molecules thick. Next, pure nickel in excess of .002 inch is plated onto the granule. At a furnace temperature of 2050° F. the copper interlayer melts and adheres (wets) completely to both the exterior of the granule and the inner surface of the nickel overlay which has a much higher melting point. There is not sufficient copper to dissolve the nickel which is thicker either from the plated interlayer or from the externally applied copper paste which serves to bond or fix the composite granule to the ferrous member, i.e., the band saw blade to which it is to be bonded. The copper paste will be referred to again presently.

When the ferrous member such as the band saw blade is put in service, the .002 inch nickel overlay of the exposed part of the tungsten carbide granule is quickly eroded away and the tungsten carbide exposed to use. The advantages of the tungsten carbide on the points of the teeth and of comparable uses is, of course, obvious to those skilled in the art.

With reference to the second mentioned difficulty, that is moving the band saw blade through the furnace in any position without having the granules fall away from their pre-placed position on the teeth by the force of gravity, it was discovered that particular ambient temperature adhesives could be used for this purpose. One of the methacrylate series of resins was found successfully to serve as an adhesive for this purpose to first attach the granules in their desired position. The particular resin is butyl methacrylate suspended in water solution in the ratio of preferably 75% butyl to 25% water. This ratio, however, not being critical. This particular adhesive has the desired quality of complete chemical decomposition at temperatures below 1000° F. without the formation of non-volatile residues which could hinder or prevent the wetting action of the copper. It is obvious from this, therefore, that some other agent must assume responsibility for retention of the granules in their original position up to and through the melting point of copper. The copper paste which has been mentioned as the source of copper for obtaining bond between the granules and the ferrous member contains copper which is produced electrolytically and is of a particle size less than .5 micron. It can, therefore, be mixed with a proper vehicle to a paint like consistency, which it resembles when it is applied to granules which are already positioned by the methacrylate adhesive on the ferrous member.

It was necessary to have a vehicle for the copper paste overlay which would serve to cake the copper overlay to a degree where it would form a somewhat "adobe-like" or clay structure and be mechanically strong enough to encrust the tungsten carbide granules and retain them in position until the melting copper could hold them in place with its high surface tension, through the liquid copper phase and to final solidification. It is obvious that this caking action with the copper paste was limited to vehicles that would decompose and leave no deterrent residues. A vehicle was finally discovered which yielded the exact results required. This was algycol-glycerine mixture in a true mixture of 80% ethylene glycol and 20% glycerine. This mixture was found to be highly satisfactory and successful although the percentages are not critical. It is considered that the mixture could be satisfactorily used with the ethylene glycol in the range of 60 to 95% and the glycerine in a range of 5 to 40%.

In addition to the objects stated in the foregoing, it will be observed that additional objects of the invention are to provide solutions to the particular difficulties stated in the foregoing and to, therefore, make possible and provide a succesful, efficient and effective tungsten carbide brazing method.

Other objects of the invention are to make available knowledge as to particular materials that can be successfully used to effectuate the process and to meet the difficulties as stated in the foregoing. As pointed out, an exemplary embodiment of the invention is described herein with reference to the brazing of tungsten carbide granules to a steel saw blade. Commercial quantities of such band saw blades for the foam glass industry have been produced by the herein methods with complete success. The foam glass referred to as a commercial material used primarily for insulating purposes, more particularly in the field of cryogenics for insulating down to very low temperatures.

Further objects and additional advantages of the invention will become apparent from the detailed description and annexed drawings wherein:

The single figure is a flow diagram of the method or process of the invention.

The invention having been described in the foregoing, the exemplary embodiments will be further described by way of a more specific example thereof.

The tungsten carbide chips are a product that is commercially available; also scrap carbide may be used and the chips may be made simply by crushing the tungsten carbide material. In the examplary embodiment, 80 mesh chips are used, but the mesh is not critical; 36 mesh chips may be used, for example. It may be pointed out that the tungsten carbide chips may be brazed to the points of the teeth of steel band saw blades or on the other hand, the band saw blade may be one that does not have teeth as such at all. Preferably, however, the saw blade has extending projections resembling teeth with spaces or interstices between them to receive the glass chips from the glass foam when it is being sawed.

The various steps of the method are illustrated by the flow diagram in the figure. The first part of the process involves the "encapsulation" of the tungsten carbide granules. The first step, as indicated at 1 in the flow diagram, is that of applying the extremely thin electro-plate of copper to the granules of tungsten carbide. This may be done in a known manner by a regular electroplating process using standard equipment and materials, including the solution, etc. As pointed out, this plate called a copper strike in the plating industry is only a few molecules thick.

The next step, as indicated at 2 on the flow diagram is the electroplating of pure nickel in excess of .002 inch onto the granules. This step is also done by way of standard electroplating equipment and techniques.

After electroplating the nickel onto the granules they are air dried as indicated by number 3 on the flow diagram simply by spreading them out on a flat surface and allowing them to dry.

The next step as indicated at 4 on the flow diagram is the application of the resin adhesive for holding the granules in position on the saw blade as it passes through the furnace with the teeth in any position. The nature of the adhesive is described in the foregoing and, in the exemplary embodiment, as stated, was butyl methacrylate suspended in a water emulsion in the ratio of 75% butyl methacrylate to 25% water. This adhesive may be applied in any way, and by way of example, the teeth of the band saw may be simply dipped into it or it may be applied in any other way such as by brushing it on.

The next step is the application of the tungsten carbide granules or chips to the saw blade or ferrous member, that is to the part of it where chips are to be adhered as described. As to this step, 5, the chips or granules may be applied in any particular way; the saw blade may be dipped into the chips or they may be simply spread or shaken on in the manner of applying salt from a salt shaker.

The next step as designated at 6 in the flow diagram is the application of the copper paste which serves to fix the composite granules to the ferrous member or band saw to which they are to be bonded. The copper paste is a commercially produced product. The copper is produced electrolytically and is of a particle size less than .5 micron. It can, therefore, be mixed with a proper vehicle to a paint-like consistency which it resembles when it is applied to granules which are already positioned by the methacrylate adhesive on the ferrous member. The copper paste comprises finely divided copper mixed with the vehicle to a paint like consistency as stated, the consistency can be controlled in order to regulate its application to the granules to produce the desired results. A preferred and successful mixture was the glycolglycerine mixture described above.

The next step 7 on the diagram is the brazing operation which is carried out in a controlled atmosphere furnace having a hydrogen-nitrogen atmosphere at a temperature of 2050° F. This temperature is somewhat critical and should be held to plus or minus 20° F. of this figure. The furnace is a standard commercial furnace having the said controlled hydrogen-nitrogen atmosphere which is substantially 40% hydrogen and 60% nitrogen. There is an enforced flow of the atmosphere through the furnace during the processing, i.e., there is a positive pressure in the furnace at all times. The furnace is a standard type of furnace for copper brazing, the furnace itself not being critical. The particular furnace used included a furnace cooling chamber with a controlled atmosphere. Within this chamber the saw blades and brazed granules are brought down to 400° F., step 8. The time during which the temperature is reduced is not critical and at the end of this period the finished product is realized.

The copper paste sets up like clay. The paste is a poor heat conductor. The inner surface cooper melts first since the ferrous metal is a good heat conductor. Progressive melting outwardly occurs while the granules remain encapsulated, the granules being held in place by surface tension of the copper described.

From the foregoing, those skilled in the art will observe that the invention provides a novel, successful and effective process for tungsten carbide brazing. It will be observed that the invention achieves and realizes the objects, both general and specific as stated in the foregoing, as well as having the advantages enumerated as well as many additional advantages.

The foregoing disclosure is representative of a preferred form of the invention and is to be interpreted in an illustrative rather than a limiting sense, the invention to be accorded the full scope of the claims appended hereto.

What is claimed is:

1. A method of brazing tungsten carbide to ferrous bodies comprising the steps of forming the tungsten carbide in granules, encapsulating the tungsten carbide granules before brazing in a thin electroplate of copper, encapsulating the coated granules with a second thin electroplate of nickel, attaching the granules to the ferrous body by a heat decomposable resin and a copper brazing paste containing an ethylene glycol-glycerine mixture and brazing the granules to the ferrous body in a brazing furnace while chemically decomposing said resin.

2. A method as in claim 1 including the step of air drying the encapsulated granules prior to brazing.

3. A method as in claim 1 wherein the step of attaching the granules includes applying externally, over said granules, said copper paste containing an ethylene glycol-glycerine mixture to the ferrous body and granules and thereby further bonding the composite granules to the ferrous body by the said copper paste in the brazing operation, and holding the granules on the ferrous body by the high surface tension of the melting copper of said paste through the range of furnace temperature at which the copper melts.

4. A method as in claim 3 comprising forming the copper paste with a liquid vehicle into a paint-like consistency having a character such that the copper paste forms an overlay which cakes to form an adobe-like structure encrusting the tungsten carbide granules and retaining them in place until the melting copper holds them in place.

5. A method as in claim 4 including the step of forming the resin from a methacrylate resin.

6. A method as in claim 5 including the step of forming the resin from butyl methacrylate suspended in a water solution in a ratio of substantially 75% butyl to 25% water.

7. A method as in claim 1 including the step of forming the glycol-glycerine mixture as a true mixture in the ratio of substantially 80% ethylene glycol and 20% glycerine.

8. A method as in claim 3 including the step of accomplishing the brazing at a temperature of substantially 2050 degrees. F.

9. A method as in claim 8 including the step of accomplishing the brazing in a furnace in which there is provided a controlled hydrogen-nitrogen atmosphere.

10. A method as in claim 9 wherein the hydrogen-nitrogen atmosphere is one which substantially is 40% hydrogen and 60% nitrogen.

References Cited by the Examiner

UNITED STATES PATENTS

| | | | |
|---|---|---|---|
| 1,922,254 | 8/1933 | McCulloch | 117—46 |
| 2,360,479 | 10/1944 | Detrick et al. | 117—46 |
| 2,398,132 | 4/1946 | Cottrell | 204—40 X |
| 2,461,878 | 2/1949 | Christensen et al. | 117—46 |
| 2,633,521 | 3/1953 | Becker et al. | 117—46 |
| 2,694,647 | 11/1954 | Cole | 117—22 |
| 2,858,600 | 11/1958 | Vigor | 117—22 X |
| 2,908,072 | 10/1959 | Johnson | 117—22 X |
| 3,023,490 | 3/1962 | Dawson. | |
| 3,024,128 | 3/1962 | Dawson | 117—46 |
| 3,049,435 | 8/1962 | Shwayder | 117—22 |
| 3,096,567 | 7/1963 | Ross | 177—46 |
| 3,117,845 | 1/1964 | Reed | 117—22 X |

FOREIGN PATENTS

| | | |
|---|---|---|
| 346,473 | 4/1931 | Great Britain. |
| 824,092 | 11/1959 | Great Britain. |

JOHN F. CAMPBELL, *Primary Examiner.*

WILLIAM D. MARTIN, *Examiner.*

R. S. KENDALL, *Assistant Examiner.*